United States Patent
Chen et al.

(10) Patent No.: US 9,247,379 B2
(45) Date of Patent: Jan. 26, 2016

(54) METHOD AND APPARATUS FOR HIERARCHICAL MAP TILING

(71) Applicant: QUALCOMM Incorporated, San Diego, CA (US)

(72) Inventors: Yin Chen, Campbell, CA (US); Payam Pakzad, Mountain View, CA (US); Eric K. Holm, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 14/165,386

(22) Filed: Jan. 27, 2014

(65) Prior Publication Data

US 2015/0215731 A1 Jul. 30, 2015

(51) Int. Cl.
*H04W 24/00* (2009.01)
*H04W 4/02* (2009.01)

(52) U.S. Cl.
CPC ........................................ *H04W 4/02* (2013.01)

(58) Field of Classification Search
CPC .................................. H04W 64/00; H04W 4/20
USPC .................. 455/456.1, 67.7, 440, 456.3, 417; 370/338, 310; 702/150, 321; 379/265.11; 340/928, 573.4; 715/728; 718/103

See application file for complete search history.

(56) References Cited

U.S. PATENT DOCUMENTS

| | | | |
|---|---|---|---|
| 2004/0104841 A1 | 6/2004 | Syrjarinne et al. | |
| 2006/0234722 A1* | 10/2006 | Hanebeck et al. | 455/456.1 |
| 2007/0049295 A1 | 3/2007 | Soliman et al. | |
| 2008/0176583 A1* | 7/2008 | Brachet | G01S 5/0236 |
| | | | 455/456.3 |
| 2009/0117907 A1 | 5/2009 | Wigren et al. | |
| 2010/0062790 A1* | 3/2010 | Wigren | 455/456.1 |
| 2011/0136503 A1 | 6/2011 | Sridhara et al. | |
| 2014/0149070 A1* | 5/2014 | Cheng | G01S 5/0263 |
| | | | 702/150 |
| 2015/0004997 A1* | 1/2015 | Gao et al. | 455/456.1 |

FOREIGN PATENT DOCUMENTS

WO 2014052252 A2 4/2014

OTHER PUBLICATIONS

International Search Report and Written Opinion—PCT/US2015/010088—ISA/EPO—Sep. 4, 2015, 10 pgs.

* cited by examiner

*Primary Examiner* — Kiet Doan
(74) *Attorney, Agent, or Firm* — Hunter Clark PLLC

(57) ABSTRACT

A method for processing assistance data associated with positioning of a mobile device as described herein includes estimating an initial location of the mobile device within an area; designating the initial location of the mobile device as a focal point; retrieving a subset of hierarchical assistance data as a function of the focal point; and generating a multi-level assistance data structure for the area centered at the focal point.

26 Claims, 10 Drawing Sheets

METHOD AND APPARATUS FOR HIERARCHICAL MAP TILING

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are utilized to obtain and utilized to locate the position of a wireless communication device. For instance, location based services (LBSs) leverage the location of an associated device to provide controls for one or more applications running on the device. Applications of LBS functionality implemented with respect to wireless communication devices include personal navigation, social networking, targeting of content (e.g., advertisements, search results, etc.), among others.

SUMMARY

An example of a method for processing assistance data associated with positioning of a mobile device is described herein. The method includes estimating an initial location of the mobile device within an area; designating the initial location as a focal point; retrieving a subset of hierarchical assistance data associated with the area as a function of the focal point; and generating a multi-level assistance data structure for the area centered at the focal point using retrieved hierarchical assistance data.

An example of a mobile device operable in a wireless communication network is described herein. The mobile device includes a location estimation module configured to estimate an initial location of the mobile device within an area; an assistance data retrieval module communicatively coupled to the location estimation module and configured to retrieve a subset of hierarchical assistance data associated with the area as a function of the initial location of the mobile device; and an assistance data population module communicatively coupled to the assistance data retrieval module and configured to generate a multi-level assistance data structure for the area centered at the initial location of the mobile device.

An example of an apparatus for processing assistance data associated with a positioning operation is described herein. The apparatus includes means for estimating an initial location of the apparatus within an area; means for retrieving a subset of hierarchical assistance data associated with the area as a function of the initial location; and means for generating a multi-level assistance data structure for the area centered at the initial location using retrieved hierarchical assistance data.

An example of a mobile communications device as described herein includes at least one processor configured to execute instructions which, when executed, cause the at least one processor to estimate an initial location of the mobile communications device within an area; designate the initial location as a focal point; retrieve a subset of hierarchical assistance data associated with the area as a function of the focal point; and generate a multi-level assistance data structure for the area centered at the focal point using retrieved hierarchical assistance data. The mobile communications device further includes a memory coupled to the at least one processor and configured to store the instructions.

Items and/or techniques described herein may provide one or more of the following capabilities, as well as other capabilities not mentioned. Accuracy of a mobile positioning application may be increased relative to the memory or network bandwidth usage associated with the application. By reducing the overall size of data utilized by a positioning application at one time, positioning within larger areas may be supported. Overall computing usage associated with mobile positioning is decreased relative to existing approaches, which may enable faster and more efficient positioning and provide mechanisms for positioning operations to be performed at mobile devices with less memory or other resources than those that are used for other positioning techniques. Other capabilities may be provided and not every implementation according to the disclosure must provide any particular capability, let alone all of the capabilities, discussed. Further, it may be possible for an effect noted above to be achieved by means other than that noted, and a noted item/technique may not necessarily yield the noted effect.

DETAILED DESCRIPTION

Described herein are systems and methods for retrieving and utilizing hierarchically tiled assistance data for mobile positioning. The techniques described herein are utilized for assisted mobile positioning, in which assistance data such as access point (AP) heatmap data, connectivity and/or pathing information, etc., are used to aid in positioning devices within a venue or region. Generally, a set of assistance data for a given area is generated and stored by servers and/or other computing entities for subsequent retrieval by a device performing positioning in the area. In some implementations, the set of assistance data for a given venue includes a regular grid overlaid on top of a map of the venue, which is structured such that heatmap values, map connectivity, etc., are made available at the grid points. For precise positioning, this grid typically has a fine resolution (e.g., 2 feet). However, a high-resolution grid results in a large set of assistance data for large venues. Since many mobile devices that utilize positioning solutions are constrained in terms of memory capacity, storage capacity, data transfer limitations, and/or other operational parameters, it is therefore often difficult for mobile devices to effectively fetch and utilize assistance data for large areas using conventional approaches.

Further, while simply reducing the amount (or resolution) of assistance data used would lower the amount of assistance data used for positioning, this introduces error into the positioning calculations and may in some cases result in positioning operations to fail. In particular, mobile positioning techniques generally rely upon a roughly accurate initial location. If the initial location and its associated information are substantially incorrect, subsequent position fixes may be incorrect or inaccurate (e.g., confined to the wrong area of the map), delayed, or even impossible to detect and recover in degenerate cases. In the specific case of maps with a concave shape, a simple centroid-of-visible-APs method of initialization fails. Further, a simple reduction in the resolution of assistance data can load to quantization error, which in turn affects the overall performance of the system.

In view of the above, systems and methods described herein generate a multi-level hierarchical assistance data structure generated for an area. Assistance data for an area are tiled into smaller parts that can be retrieved (loaded, downloaded, etc.) by a mobile device within the area as needed. For instance, based on a rough initial position estimate for a mobile device, the mobile device can load only tiles determined to be relevant based on the initial location. By using the systems and methods described herein, devices performing positioning within an area can dynamically utilize relevant portions of an assistance data structure to compute position fixes with increased precision relative to resource usage.

Figure 1:
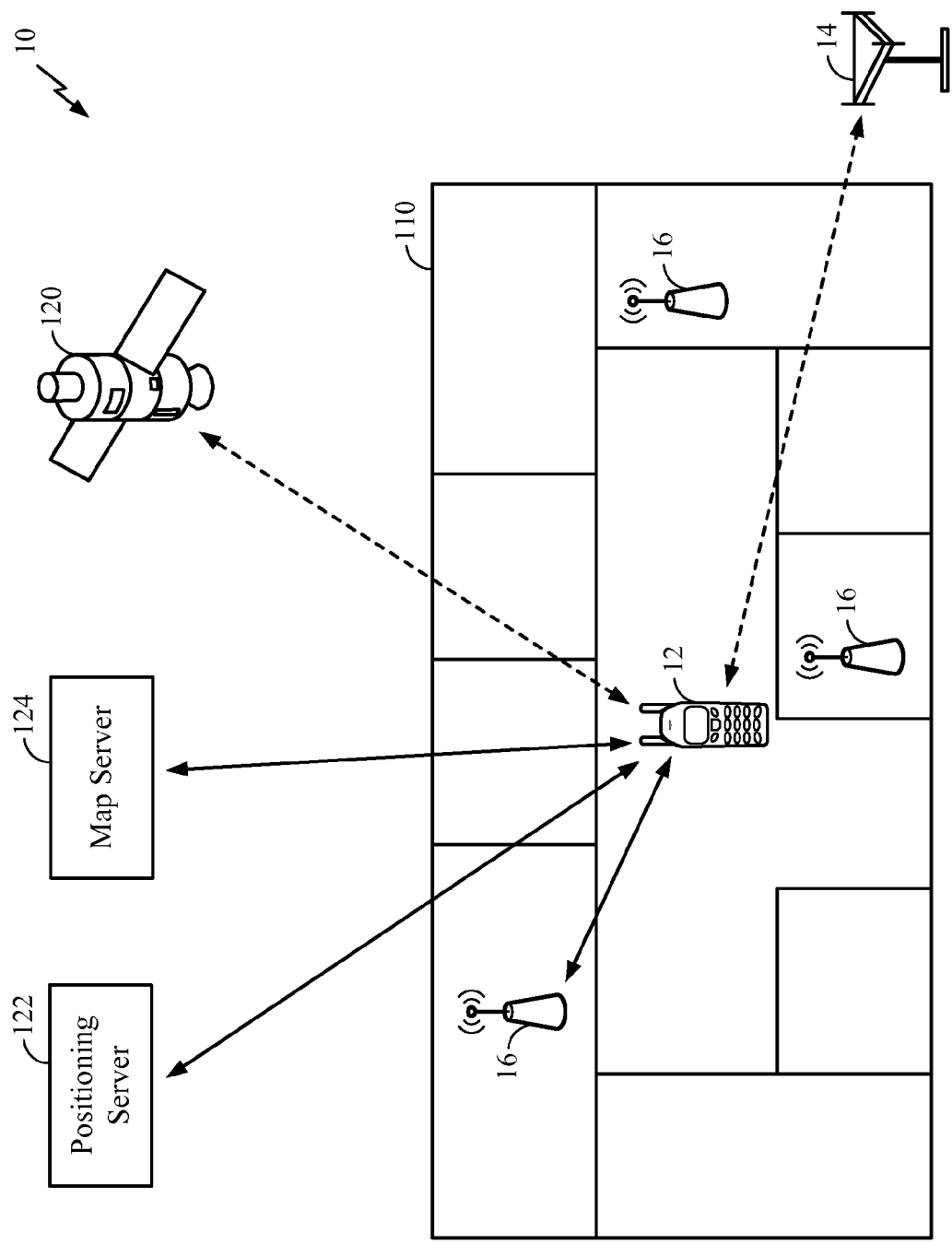
FIG. 1 is a schematic diagram of a wireless communication environment associated with an indoor region.

Systems and methods described herein operate via one or more mobile devices operating in a wireless communication system. Referring to FIG. 1, a wireless communication system 10 includes one or more base transceiver stations (BTSs), here one BTS 14, and wireless access points (APs) 16. The BTS 14 and APs 16 provide communication service for a variety of wireless communication devices, referred to herein as mobile devices 12. Wireless communication devices served by a BTS 14 and/or AP 16 can include, but are not limited to, personal digital assistants (PDAs), smartphones, computing devices such as laptops, desktops or tablet computers, automobile computing systems, etc., whether presently existing or developed in the future.

The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTS 14 and APs 16 can wirelessly communicate with the mobile devices 12 in the system 10 via antennas. A BTS 14 may also be referred to as a base station, a Node B, an evolved Node B (eNB), etc. The APs 16 may also be referred to as access nodes (ANs), hotspots, etc. The BTS 14 is configured to communicate with mobile devices 12 via multiple carriers. The BTS 14 can provide communication coverage for a respective geographic area, such as a cell. The cell of the BTS 14 can be partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

While both a BTS 14 and APs 16 are shown in the system 10, a wireless communication environment need not contain both BTSs 14 and APs 16, and may include BTSs 14, APs 16, or both in any number or configuration. Generally, a BTS 14 supports communication via one or more cellular radio access technologies such as Global System for Mobile Communication (GSM), Universal Mobile Telecommunications System (UMTS), Long Term Evolution (LTE) and/or other technologies developed by the Third Generation Partnership Project (3GPP), CDMA2000 and/or other technologies developed by 3GPP2, etc. An AP 16 generally supports communication via one or more technologies based on the IEEE (Institute of Electrical and Electronics Engineers) 802.11 specifications (e.g., Wi-Fi) or the like. However, BTSs 14 and APs 16 are not limited to these technologies and may employ additional or alternative functionality. Further, a single device may include some or all functionality of both a BTS 14 and an AP 16.

As further shown in system 10, the mobile device 12 is positioned within a venue (area, region) 110. The venue 110 may be an indoor area such as a shopping mall, a school, etc., or an outdoor area. Here, the APs 16 are positioned within the venue 110 and provide communication coverage for respective areas (rooms, stores, etc.) of the venue 110. Access to an AP 16 in the system 10 may be open, or alternatively access can be secured with a password, encryption key or other credentials.

Mobile devices 12 can be dispersed throughout the system 10. The mobile devices 12 may be referred to as terminals, access terminals (ATs), mobile stations, user equipment (UE), subscriber units, etc. The mobile devices 12 can include various devices as listed above and/or any other devices.

As further shown in FIG. 1, a mobile device 12 may receive navigation signals from a satellite positioning system (SPS), e.g., through SPS satellites 120. The SPS satellites 120 can be associated with a single multiple global navigation satellite system (GNSS) or multiple such systems. A GNSS associated with SPS satellites 120 can include, but are not limited to, Global Positioning System (GPS), Galileo, Glonass, Beidou (Compass), etc. SPS satellites 120 are also referred to as satellites, space vehicles (SVs), etc.

In general, a mobile device 12 may be configured to obtain a partial or complete estimate of its current position within the system 10 using various techniques based on other communication entities within view and/or information available to the mobile device 12. For instance, a mobile device 12 can estimate its position using measurements performed on signals obtained from APs 16 associated with one or more wireless local area networks (LANs), personal area networks (PANs) utilizing a networking technology such as Bluetooth or ZigBee, etc., SPS satellites 120, etc. These measurements may include signal strength measurements (e.g., received signal strength indication (RSSI) measurements, etc.), timing measurements (e.g., round trip time (RTT) measurements, etc.), or the like.

Additionally, a mobile device 12 may compute its position within a given area 110 using position assistance data (also referred to as "assistance data" or "AD") associated with the area 110. Assistance data may be stored locally at a mobile device 12 and loaded as needed. Additionally or alternatively, assistance data may be stored at one or more devices other than the mobile device 12, such as a positioning server 122, and communicated as needed to the mobile device. Techniques for retrieving and structuring such assistance data are described in further detail below. A mobile device 12 may also utilize additional information in computing a location estimate, such as map constraint data obtained from a map server 124, or other information.

Figure 2:
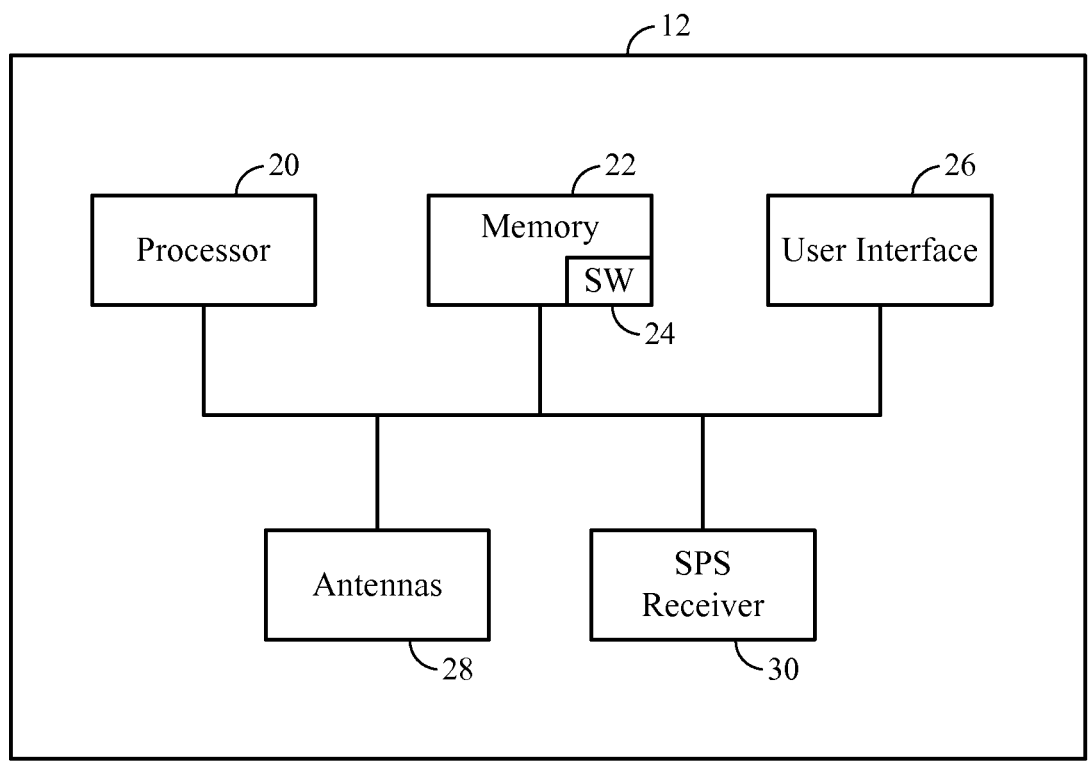
FIG. 2 is a block diagram of components of one embodiment of a mobile station shown in FIG. 1.

Referring next to FIG. 2, the mobile device 12 comprises a computer system including a processor 20, memory 22 including software 24, a user interface 26, antennas 28, and a SPS receiver 30. The antennas 28 provide bi-directional communication functionality to other entities in one or more associated wireless communication networks, e.g., a BTS 14 associated with a cellular network, APs 16 associated with a localized communication network, etc., as shown in FIG. 1. The antennas 28 may operate independently of, or with the assistance of, a receiver, transmitter or transceiver (not shown). In some implementations, different ones of the antennas 28 may be used for different communication systems. Here, the antennas 28 include an antenna for communicating with the BTS 14 and an antenna for communicating with the APs 16. In other implementations, antennas 28 used for communication with a given communication system may optionally be further divided into transmit (Tx) antennas and receive (Rx) antennas. Alternatively, respective ones of the antennas 28 can be used for both transmission and reception for an assigned system or combination of systems. In still other implementations, a mobile device 12 may have only a single antenna 28, which serves as both a Tx and a Rx antenna on all networks associated with the mobile device 12.

The device 12 shown in FIG. 2 further includes a SPS receiver 30 for receiving SPS signals (e.g., from SPS satellites 120) via one or more associated SPS antennas (not shown) as generally described above with respect to FIG. 1. However, as described herein, a SPS receiver 30 may be optional in some implementations of the mobile device, and a mobile device 12 can be operable to perform the techniques described herein with either no SPS receiver 30 or an SPS receiver with limited functionality.

The processor 20 is preferably an intelligent hardware device, e.g., a central processing unit (CPU) such as those made by ARM®, Intel® Corporation, or AMD®, a microcontroller, an application specific integrated circuit (ASIC), etc. The processor 20 could comprise multiple separate physical entities that can be distributed in the mobile device 12. The memory 22 includes random access memory (RAM) and read-only memory (ROM). The memory 22 is a non-transitory processor-readable storage medium that stores software 24 which is processor-readable, processor-executable software code containing processor-readable instructions that are configured to, when executed, cause the processor 20 to perform various functions described herein (although the description may refer only to the processor 20 performing the functions). Alternatively, the software 24 may not be directly executable by the processor 20 but configured to cause the processor 20, e.g., when compiled and executed, to perform the functions. Media that can make up the memory 22 include, but are not limited to, RAM, ROM, FLASH, disc drives, etc.

The user interface 26 comprises means and/or mechanisms for providing input/output functionality to a user of the mobile device. For instance, the user interface 26 may include a display for rendering information for viewing by a user of the device 12. A display may include a physical surface, such as a screen, on which information is shown, and/or a projector or other means for projecting information onto a surface not associated with the device 12. The user interface 26 may further include speakers and/or other mechanisms for providing audio output to a user of the device 12. The user interface 26 further includes one or more input devices, such as a keypad, touch pad or touchscreen, keyboard, mouse, etc. One or more elements of the user interface 26, such as a touchscreen, may provide both input and output functionality. Elements of the user interface 26 may be physically integrated into the device 12, or some elements may be external to and communicatively coupled to the device 12, e.g., via wired (e.g., Universal Serial Bus (USB), FireWire, etc.) and/or wireless communication links.

Figure 3:
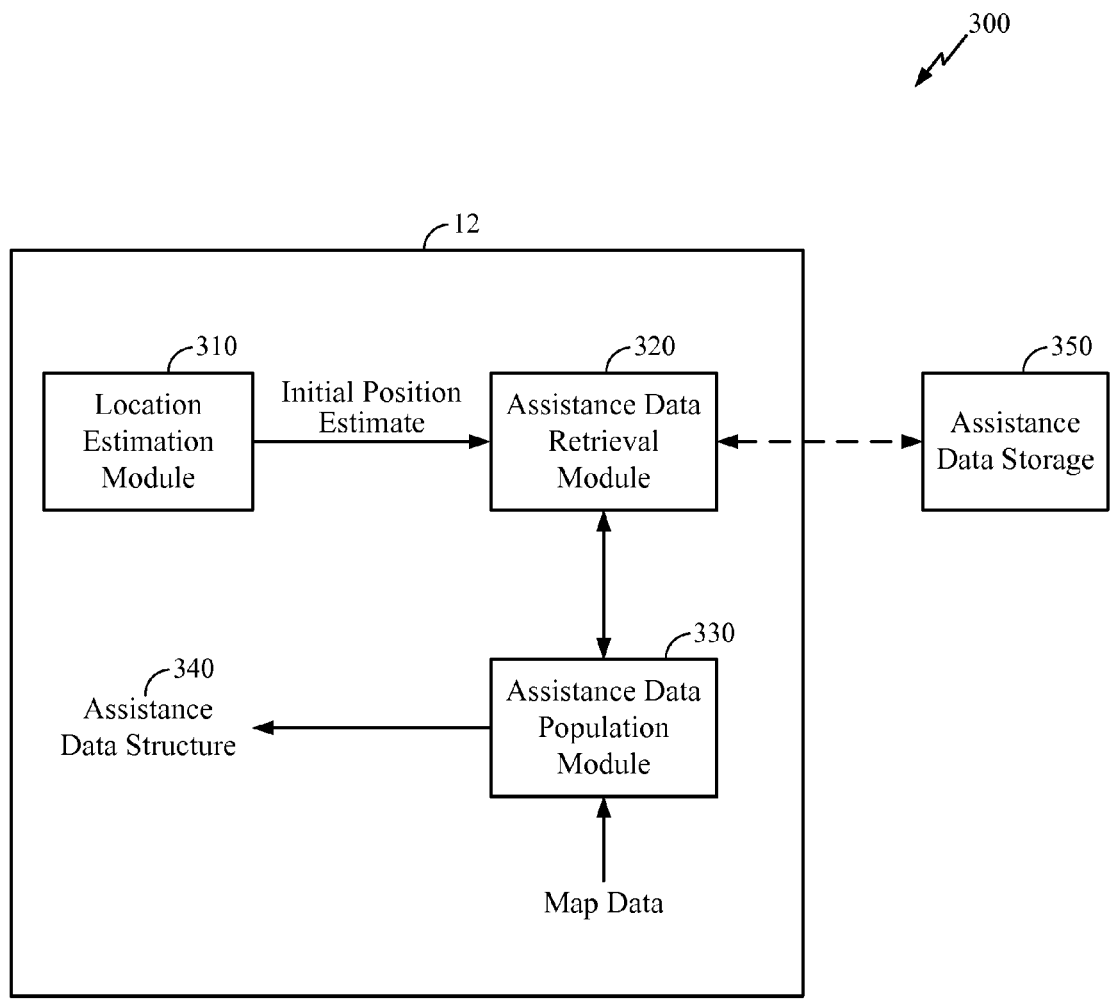
FIG. 3 is a block diagram of a system for generating a hierarchically tiled structure for position assistance data.

Referring next to FIG. 3, a system 300 for generating a hierarchically tiled structure for position assistance data includes a location estimation module 310, an assistance data retrieval module 320 and an assistance data population module 330, which interact with assistance data storage 350 to generate a multi-level assistance data structure 340 as described below. The modules 310, 320, 330, may be implemented in software (e.g., as software 24 stored on a memory 22 and executed by a processor 20), hardware, and/or a combination of software and hardware. Further, while the modules 310, 320, 330 are illustrated in system 300 as being located within and implemented by a mobile device 12, one or more of these modules 310, 320, 330 may be implemented via a device remote from a mobile device 12. In such an implementation, the mobile device 12 may request processing from one or more remote modules and receive results of such processing via a communication means, such as antennas 28. Further, while the assistance data storage 350 is illustrated in system 300 as separate from the mobile device 12, in some implementations the assistance data storage 350 may be internal storage at the mobile device 12, as described below. Additionally, some or all functionality of the modules 310, 320, 330 may be performed via separate modules as shown in system 300 or combined into one or more common modules. For instance, the functionality of the assistance data retrieval module 320 and the assistance data population module 330 as described below may be combined into a common module. Other implementations are possible.

The assistance data structure 340 generated by the system 300 includes a hierarchical, or multi-level, grid spanning an entire map corresponding to a region or area of interest. The hierarchical grid includes multiple levels with mutually distinct resolutions. The resolutions of the grid levels are assigned such that the grid resolution around the initial estimate of a mobile device's position is a highest or finest resolution (e.g., 2 ft, etc.) gradually reduces or becomes coarser as distance from the initial estimate increases. By generating assistance data in this manner, the total size of the assistance data remains low while retaining a high-resolution grid near an area of interest, thereby leading to little or no loss of positioning accuracy around the area of interest. Further, since the assistance data structure 340 spans the entire map, a rough estimate of the position of the mobile device 12 will be available even if the initial estimate is incorrect. In such a case, the assistance data structure may be refocused around the new rough estimate to refine the position estimate. Techniques for generating and adjusting the assistance data structure 340 are provided in further detail below.

Assistance data stored at the assistance data storage 350 may correspond to a multi-level hierarchical structure that spans some or all of the relevant venue or area, such that the assistance data retrieval module 320 can dynamically retrieve relevant portions of the stored structure. The assistance data stored by the assistance data storage 350 corresponding to the area (hereinafter referred to as the "area assistance data" for brevity) may be generated as follows, although other techniques for generating the area assistance data other than those described herein may be used. To generate the area assistance data, a multi-level hierarchical grid is first overlaid onto a map of the area. Each level of the grid has mutually distinct resolutions and includes an arrangement of points within the area defined according to the resolution for the level. More particularly, a first level of the grid corresponds to a finest resolution and contains regular grid points spaced at a first interval that is associated with the finest resolution. Similarly, subsequent levels of the grid correspond to increasingly coarser resolutions than the previous layers and contain regular grid points spaced at increasing intervals.

The resolution and associated interval for the first grid layer is defined according to network positioning accuracy (e.g., Wi-Fi accuracy, etc.) and/or other factors. For instance, if Wi-Fi measurements within a given area are determined to be accurate to within a given range (e.g., 2 ft) based on network specifications, on-site testing, etc., the first grid layer can be configured with intervals of the determined range (e.g., 2-ft intervals) or a function of the determined range. Other techniques for setting the resolution of the first grid layer could also be used. Once a resolution for the first grid layer is set, various elements of assistance data, such as AP heatmap data, connectivity data, etc., are then assigned to each of the points of the first grid level according to techniques known in the art for obtaining such information and assigning said information to discrete points in space Once the initial grid layer is generated and the grid points of the initial layer are assigned to assistance data, subsequent grid layers are generated at respectively decreasing resolutions. The resolutions for respective subsequent grid layers may decrease such that the spacing intervals for the respective layers increases geometrically (e.g., 2 ft, 4 ft, 8 ft, . . . ), arithmetically (e.g., 2 ft, 4 ft, 6 ft, . . . ), and/or in any other suitable uniform or non-uniform manner. The total number of layers included in the grid can be determined as a function of mobile device working memory limitations, mobile device storage capacity, typical network conditions for the area, transfer limitations associated with conveying the assistance data from remote assistance data storage 350 to mobile devices 12 in the area, or other factors. For device-specific limitations, the assistance data storage 350 may account for varying device capabilities by controlling the total size of the assistance data based on minimum mobile device capabilities, average mobile device capabilities, and/or other metrics. The assistance data storage 350 may also maintain multiple instances of an assistance data structure for a single area for respective classes of mobile devices having different capabilities.

In some implementations, assistance data are assigned to grid points in subsequent grid layers based on the assistance data assigned to points in the initial layer. In other words, assistance data assigned to a high-resolution layer may be degraded in one or more ways to generate assistance data to be assigned to lower-resolution layers. For instance, if the resolutions of respective grid layers are configured to decrease geometrically, assistance data may be assigned to respective grid layers via a binary tree algorithm in which grid points for higher layers are pruned to generate grid points for lower layers. As an example, for a grid structure in which the resolution of adjacent layers decreases by a factor of two, a second grid layer can be generated by pruning every other grid point from a first grid layer, and so on. Additionally or alternatively, some assistance data assigned to a grid point in a grid layer may be computed as an interpolation of one or more neighboring grid points in the preceding layer. For instance, heatmap data for a given point in a grid layer may be computed as an average of heatmap data for the X nearest points to the given point in an upper layer (e.g., an immediately preceding layer, a top layer, etc.). In still other implementations, assistance data may be independently computed and assigned for each grid point of each grid layer.

The number of grid layers in the data stored at the assistance data storage 350 may be a constant value, e.g., set by a network administrator or a positioning scheme specification, or it may be determined by the system according to one or more criteria. For instance, the assistance data storage 350 may retain assistance data corresponding to a number of grid levels that, when combined by a mobile device 12 as described below, results in the total size of the assistance data used by the mobile device 12 being less than a highest assistance data size usable by the mobile device 12. Alternatively, the assistance data storage 350 may retain data for more grid levels than are usable by a given mobile device 12, in which case only data corresponding to a usable number of grid levels are provided to the mobile device 12. Information regarding the number of grid levels usable by a mobile device 12 may be provided by the mobile device 12 itself and/or inferred by the assistance data storage 350 based on information relating to the mobile device 12 that is known to the assistance data storage 350. The number of grid levels maintained by the assistance data storage 350 may also be based on the size of the associated area, e.g., such that assistance data for smaller areas may contain less layers, or more layers, than that for larger areas.

If grid points maintained by the assistance data storage 350 are indexed, each layer of the grid can be indexed using a single, common index. For instance, grid points of a finest layer can be indexed by row and column with respect to an origin point (e.g., a center point or corner of the area), and grid points of subsequent layers can be indexed based on their position relative to the origin point according to the same index. For a first grid layer having a resolution that is a factor of two greater than a following layer, the above indexing scheme would result in point indices (0, 0), (0, 1), (0, 2), . . . for points of the first layer along a 0-th row and (0, 0), (0, 2), (0, 4), . . . for corresponding points of the second layer. Other indexing schemes are also possible.

Once the assistance data associated with the assistance data storage 350 has been generated, positioning of a mobile device 12 within a given area according to system 300 is initialized by obtaining an initial estimate of the position of the mobile device 12 via the location estimation module 310. The initial position estimate may be obtained automatically, e.g., upon entry into the area, initialization of a positioning application on the mobile device 12, etc., or may be based on a user input or other manual triggering event (e.g., a user enabling/disabling positioning and/or location based services, etc.). An initial position obtained by the location estimation module 310 may be obtained based on a default set of assistance data for the area or no assistance data. A default set of assistance data for an area may include information corresponding to points of a grid spanning a map of the area arranged at a low resolution, e.g., a lowest resolution of assistance data available or another predetermined low resolution level. Alternatively, default assistance data may be structured as a hierarchical grid that is structured and populated as generally described below and centered on a default focal point (e.g., an entryway, a center point, and/or other designated point within the area). More generally, a default set of assistance data may be structured in any suitable manner, and in some cases may be distinct from assistance data subsequently used for generation of the assistance data structure 340.

If a default set of assistance data is available, the location estimation module 310 may then compute a position (location) estimate for the mobile device 12 using the given default set of assistance data and signal measurements from APs within range of the mobile device 12, e.g., using trilateration. Otherwise, if no default assistance data are given, the location estimation module 310 may compute an initial position estimate based on signal measurements from in-range APs alone.

An initial position estimate computed by the location estimation module 310 is subsequently designated as a focal point for subsequent positioning operations. The location estimation module 310 provides the initial estimate to the assistance data retrieval module 320, which selectively retrieves assistance data from assistance data storage 350. Here, the assistance data obtained by the assistance data retrieval module 320 are a subset of the hierarchical assistance data stored by the assistance data storage 350, as described above, such that multiple resolutions of the stored assistance data are used to span the area. In some implementations, the assistance data retrieval module 320 directs the assistance data storage 350 to provide a specific subset of the stored assistance data for the area. Alternatively, the specific subset of assistance data retrieved by the assistance data retrieval module 320 may be implicit, e.g., based on the location of the initial position estimate. For instance, the assistance data retrieval module 320 may provide a position estimate or other focal point location to the assistance data storage 350, and in response the assistance data storage 350 can return a preconfigured subset of the assistance data. The returned assistance data may include data at a first resolution within a first distance of the focal point, a second resolution within a second distance of the focal point, and so on. Other techniques are also possible.

The assistance data population module 330 processes the retrieved assistance data in combination with map constraint data (e.g., from a map server 124) and/or other data relating to the area and generates a multi-level assistance data structure 340 for the area centered at the initial position estimate. Here, the assistance data structure 340 is populated such that the resolution of the assistance data decreases as distance from a focal point, e.g., the initial location estimate, increases. The assistance data structure 340 may include data from a first level of the area assistance data for a first region within the area spanning a predefined distance from the focal point and data from at least a second level of the area assistance data having resolutions that are coarser than that of the first level for respective regions (i.e., at least a second region) within the area located outside the first region. By providing high-resolution assistance data near an estimated initial position of the device and lower-resolution assistance data elsewhere, the overall size of the assistance data utilized by the mobile device 12 at any given time is reduced with minimal impact on positioning accuracy. The first region and/or subsequent regions may be rectangular, circular, and/or arranged in any other suitable manner. The assistance data population module 330 may utilize all data retrieved by the assistance data retrieval module 320 or a subset of the retrieved data. Any unused retrieved data may be stored at the mobile device 12 for future use or discarded.

Figure 4:
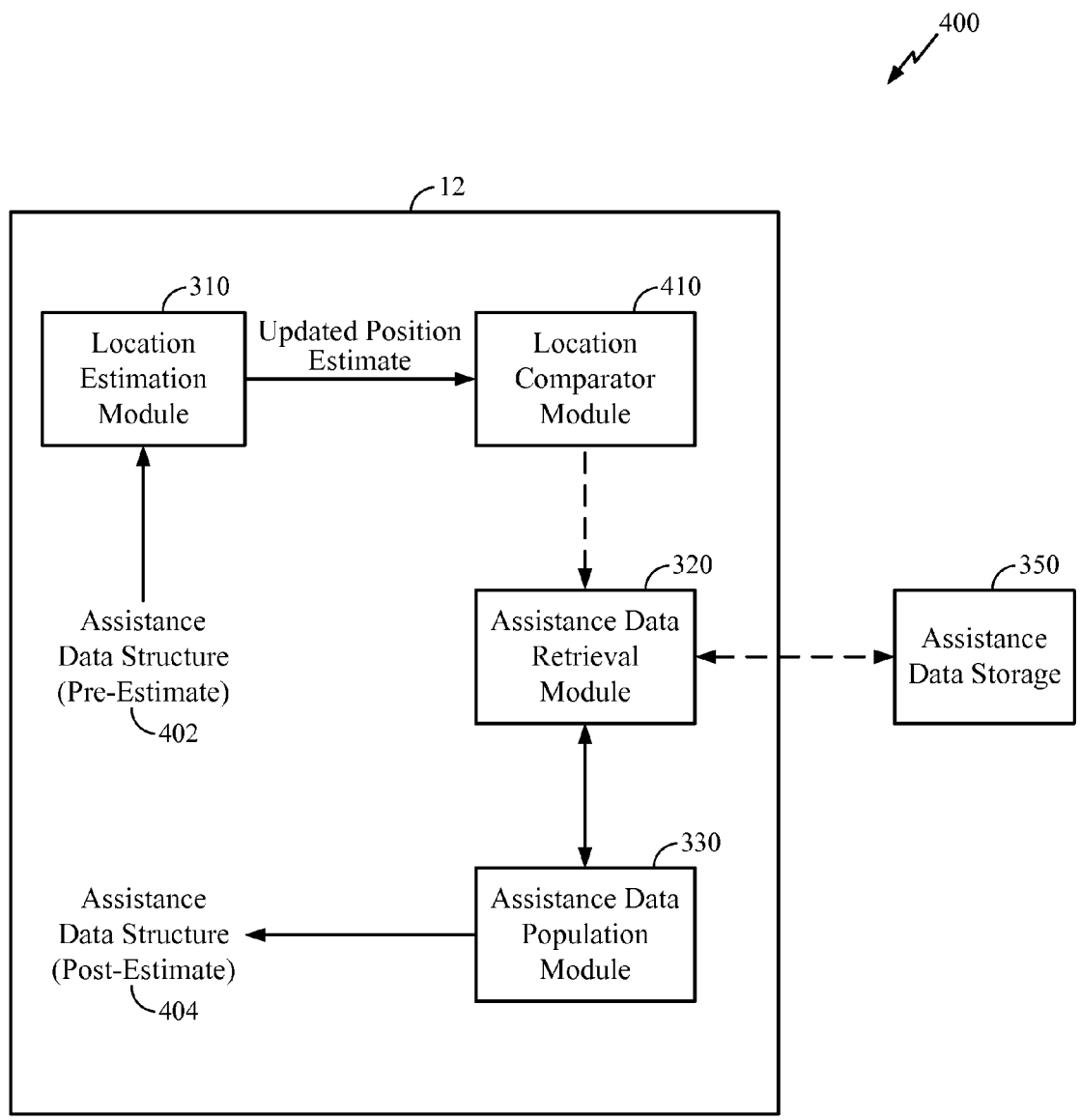
FIG. 4 is a block diagram of a system for updating a position assistance data structure based on changes in a computed device location.

As shown by system 400 in FIG. 4, the location estimation module 310 can utilize an assistance data structure 402 generated as shown in FIG. 3 to obtain an updated location estimate for the mobile device 12. As the assistance data structure 402 is hierarchically structured, the resolution of the assistance data will be non-uniform throughout the region such that the resolution increases as distance to a focal point of the assistance data structure 402 decreases. As each level of resolution in the assistance data structure 402 is indexed to a common index, the location estimation module 310 can utilize assistance data corresponding to multiple resolutions together with no or limited processing to account for the differences in resolution.

A location comparator module 410 then analyzes the updated position estimate to determine whether to direct the assistance data retrieval module 320 and/or the assistance data population module 330 to generate an updated assistance data structure 404. The location comparator module 410 may request updated assistance data upon the satisfaction of one or more criteria. These criteria may include a greater-than-threshold change in the position of the mobile device 12 between the updated position estimate and a previous position estimate, an updated position estimate that falls outside a region for which the highest-resolution assistance data is available in the previous assistance data structure 402, an accuracy associated with the updated position estimate being below a threshold accuracy level, etc. If an update to the assistance data is requested, the assistance data retrieval module 320 and the assistance data population module 330 generate a new assistance data structure 404 in a similar manner to that described with respect to FIG. 3 with the updated position estimate of the mobile device 12 as the focal point.

Figure 5:
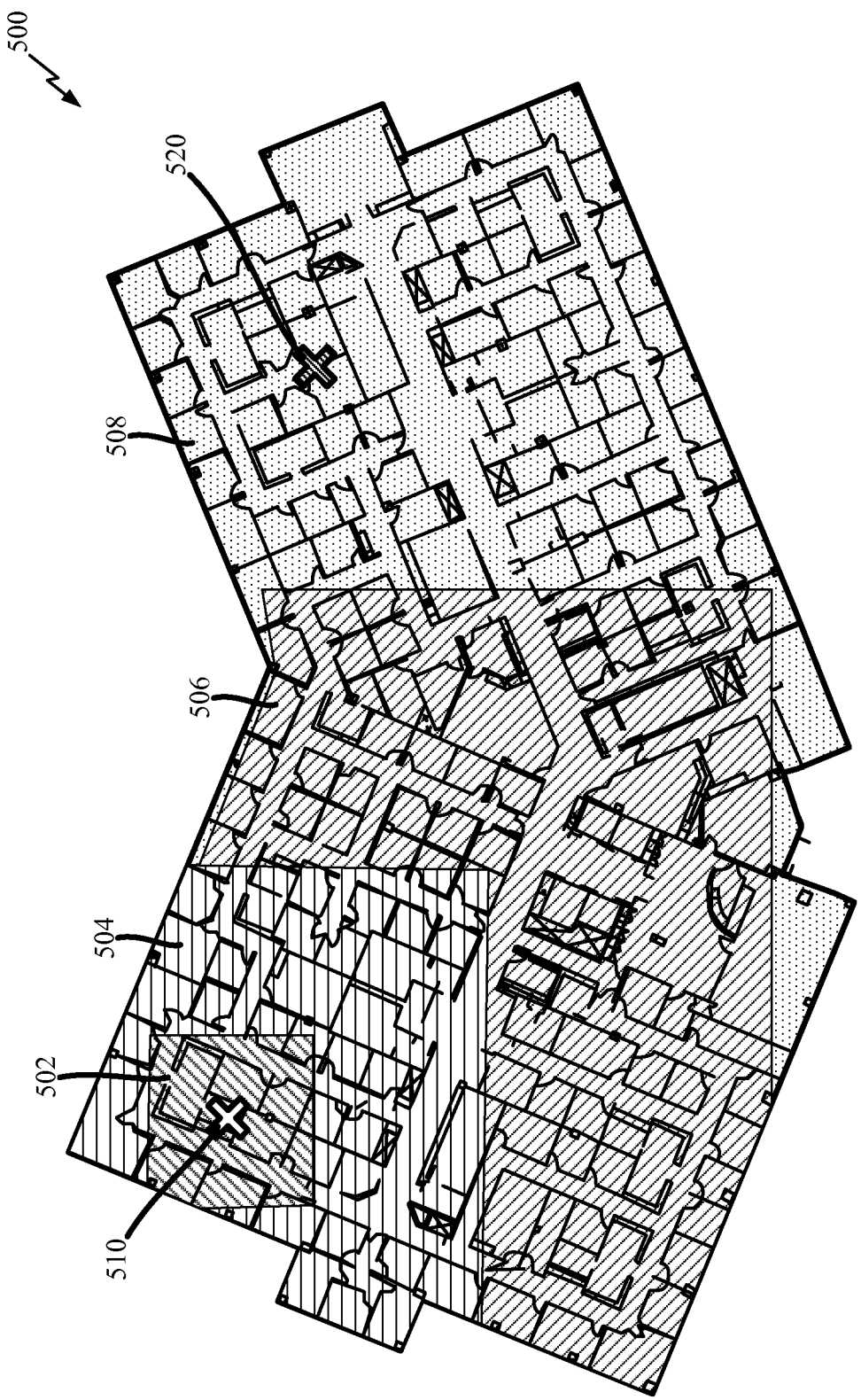
FIGS. 5-6 are illustrative views of example map tiling operations performed by the systems of FIGS. 3-4.
Figure 6:
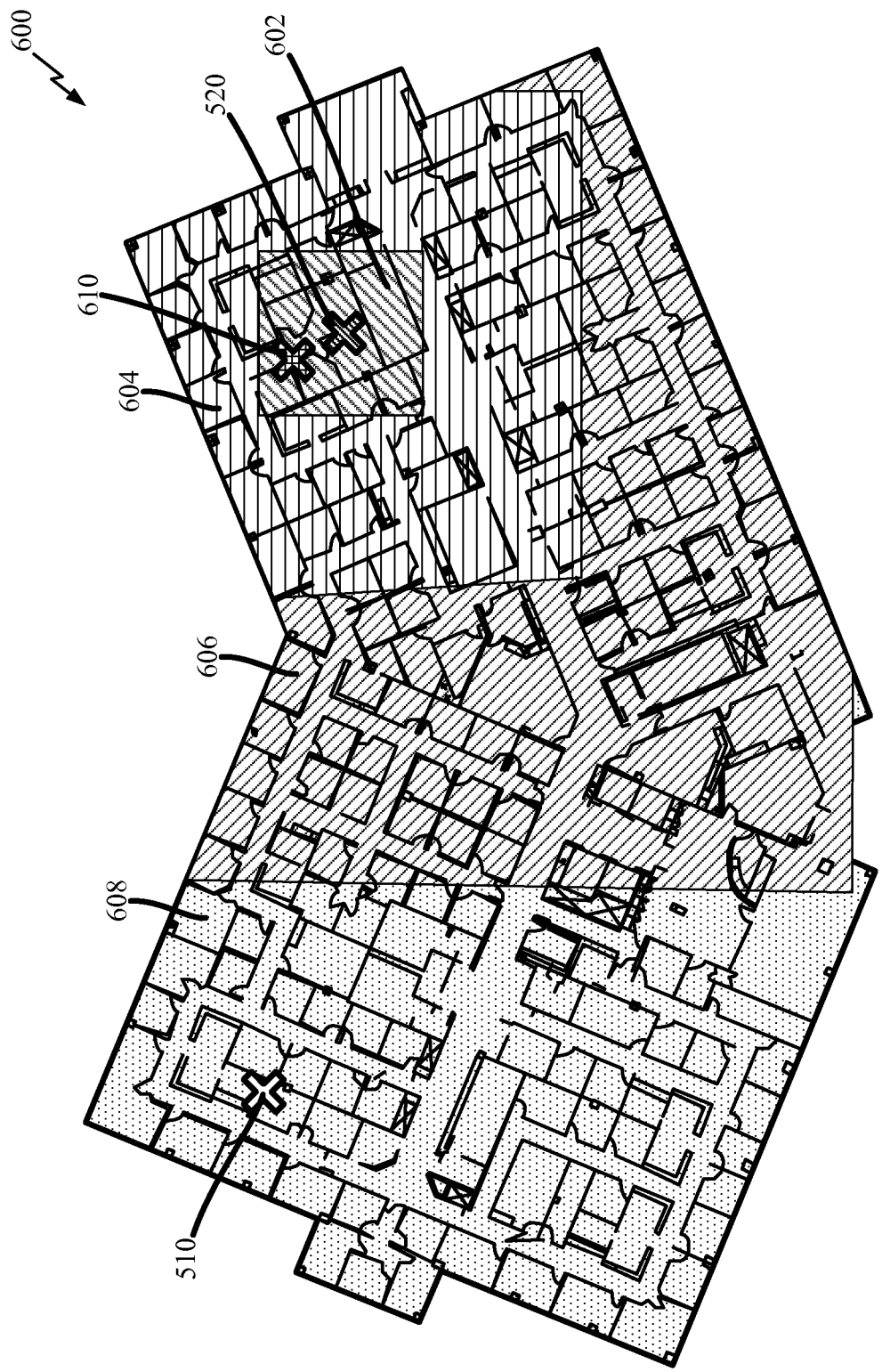

FIGS. 5-6 illustrate the use of an example hierarchical assistance data grid for positioning within a floor of a building. Referring first to diagram 500 in FIG. 5, the assistance data for the floor is partitioned into four regions 502, 504, 506, 508, having resolutions that geometrically increase by a factor of two (e.g., 2, 4, 8 and 16 feet). An initial position estimate 510 is used as a focal point for the assistance data structure shown in diagram 500. If a subsequent position estimate 520 falls outside of the highest-resolution region 502, the focal point is shifted to the new estimated location and the assistance data structure is updated. As shown in diagram 600 in FIG. 6, the assistance data structure is updated to include regions 602, 604, 606, 608 of respectively decreasing resolution centered at the updated position estimate 520. After updating the assistance data structure, the updated position estimate 520 can be refined using the higher-resolution assistance data available near the updated position estimate, and a refined position estimate 610 can be obtained.

While FIGS. 5-6 show an area partitioned into four hierarchical regions (or tiles), any number of regions can be used provided that the total number of regions and associated resolutions within the area is at least two. Further, while FIGS. 5-6 illustrate that assistance data spans the entire map, an assistance data structure may instead be generated for only part of the map, or multiple maps, or any other areas or portions thereof.

Figure 7:
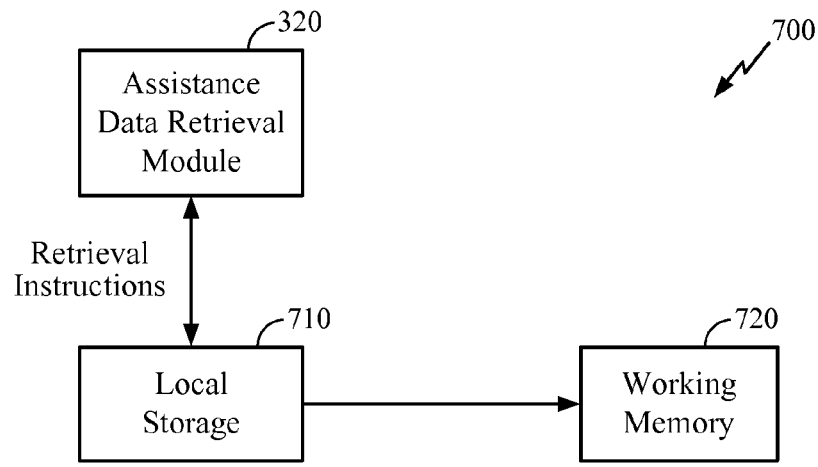
FIGS. 7-8 are block diagrams of respective systems for retrieving assistance data to be included in a multi-level assistance data structure.

Assistance data obtained by the assistance data retrieval module 320 may be locally stored at a mobile device 12 or stored on a server (e.g., positioning server 122) or another external entity. FIG. 7 illustrates a system 700 for retrieval of locally-stored assistance data. Here, area assistance data, e.g., corresponding to data stored at the assistance data storage 350 as described above, is stored at a local storage 710. The local storage 710 may be a hard drive, a flash memory device, a compact disc (CD) or digital versatile disc (DVD), and/or any other non-transitory computer storage medium. The assistance data retrieval module 320 facilitates retrieval of selected area assistance data by providing a retrieval instruction to the local storage 710. The local storage 710, in turn, loads the requested assistance data into a working memory 720 for further processing.

Figure 8:
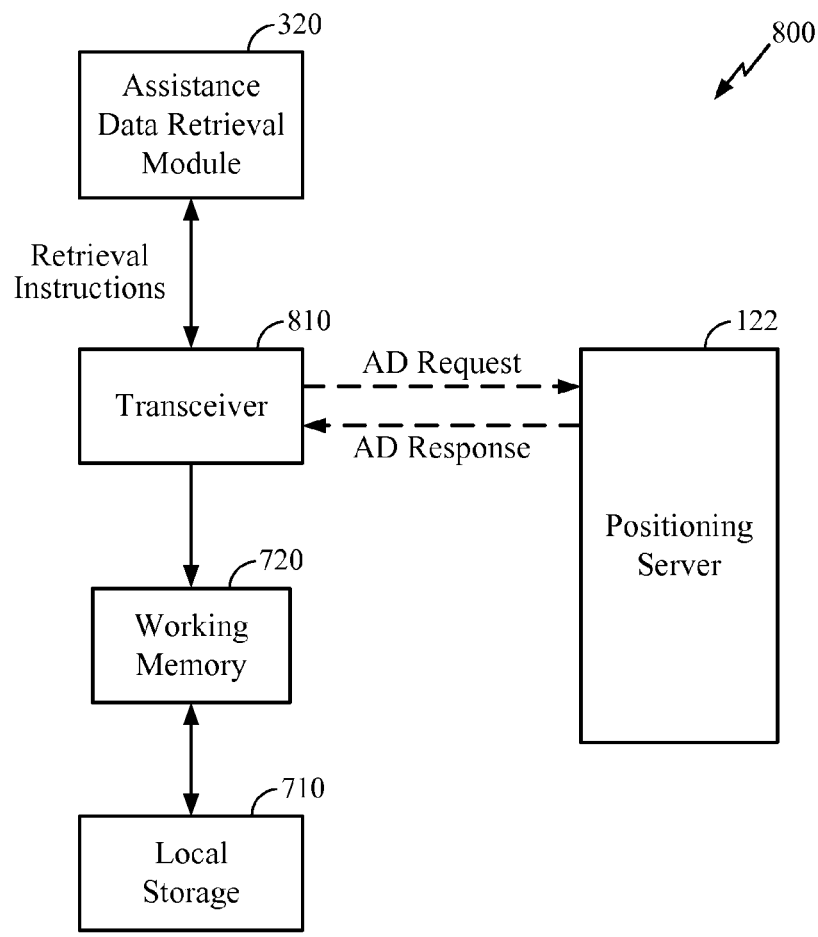

Alternatively, FIG. 8 illustrates a system 800 for retrieval of remotely-stored assistance data. Here, the assistance data retrieval module 320 instructs a transceiver 810 to request a subset of assistance data stored on a remote positioning server 122. The positioning server 122 responds to the request with the requested assistance data, which is then provided to a working memory 720, and/or a local storage 710, by the transceiver 810. The transceiver 810 may be communicatively coupled to the positioning server 122 by any wired or wireless communication technology that enables the transfer of assistance data between the transceiver 810 and the positioning server 122.

While FIGS. 7-8 are illustrated as separate implementations, the assistance data retrieval module 320 may, in some cases, retrieve both local and remote assistance data. For instance, a cache of recent or frequently used assistance data may be provided at a local storage 710 such that the assistance data retrieval module 320 can obtain cached data from the local storage 710 and request any uncached data from a positioning server 122 via a transceiver 810. Other implementations are possible.

Figure 9:
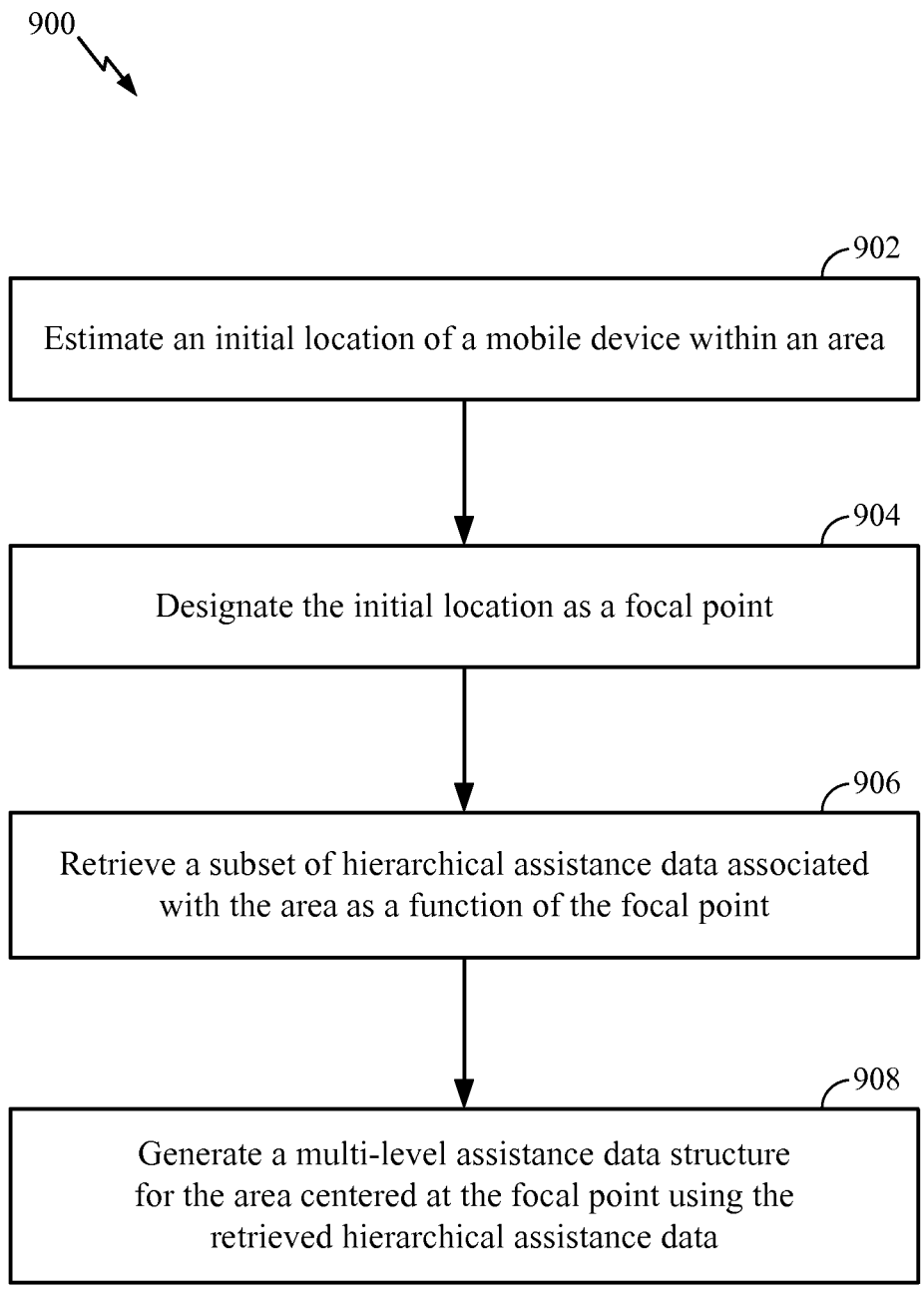
FIG. 9 is a block flow diagram of a process of compiling position assistance data for a mobile device.

Referring to FIG. 9, with further reference to FIGS. 1-8, a process 900 of compiling position assistance data for a mobile device includes the stages shown. The process 900 is, however, an example only and not limiting. The process 900 can be altered, e.g., by having stages added, removed, rearranged, combined, and/or performed concurrently. Still other alterations to the process 900 as shown and described are possible.

At stage 902, an initial location of a mobile device 12 within an area (e.g., a venue 110) is estimated, e.g., by a location estimation module 310. This location is designated as a focal point for further operations at stage 904.

At stage 906, a subset of hierarchical assistance data associated with the area is retrieved, e.g., by an assistance data retrieval module 320, as a function of the focal point designated at stage 904. In some implementations, the hierarchical assistance data may include a plurality of levels having mutually distinct resolutions, such that each of the plurality of levels include assistance data for an arrangement of points within the area defined according to the resolution for the level. The number of levels in the hierarchical assistance data, as well as the respective resolutions and associated grid spacing for each level, may be determined as described above. Further, assistance data retrieved at stage 906 may be locally stored (e.g., as shown by FIG. 7) and/or remotely stored (e.g., as shown by FIG. 8.).

At stage 908, a multi-level assistance data structure for the area is generated, e.g., by an assistance data population module 330, using the assistance data retrieved at stage 906. The multi-level assistance data structure is focused, here centered, at the focal point designated at stage 904.

Figure 10:
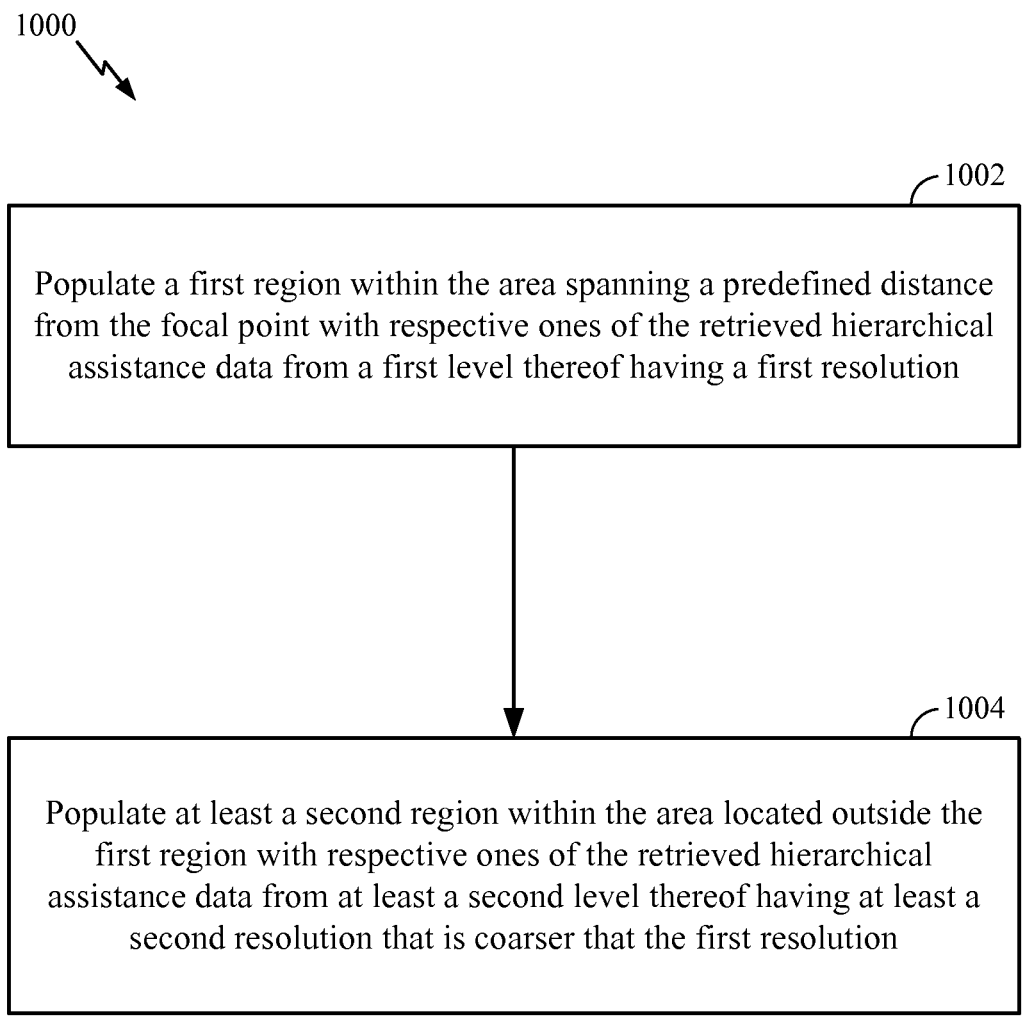
FIG. 10 is a block flow diagram of an example sub-process for generating a multi-level assistance data structure in association with the process of FIG. 9.

Stage 908 of process 900 as shown in FIG. 9 may, in turn, be performed as a set of stages comprising a process 1000, as shown by FIG. 10. The stages illustrated with respect to the process 1000 in FIG. 10, however, are examples only and not limiting. The stages shown in FIG. 10 can be altered, e.g., by having stages added, removed, rearranged, combined, and/or performed concurrently. Still other alterations to the stages as shown and described are possible.

At stage 1002, a first region within the area spanning a predefined distance from the focal point designated at stage 904 is populated with hierarchical assistance data retrieved at stage 906 from a first level of the hierarchy having a first resolution. In other words, a region nearest the focal point, e.g., region 502 surrounding focal point 510 in FIG. 5, is populated with assistance data of a highest resolution.

At stage 1004, a second region within the area located outside the first region created at stage 1002 is populated with hierarchical assistance data retrieved at stage 906 from at least a second level of the hierarchy. Each level of the hierarchy used at stage 1004 is associated with a corresponding resolution, and each of the resolutions of said levels are coarser than the first resolution used at stage 1002. In other words, one or more regions within the area but outside of the initially generated region (e.g., one or more of regions 504, 506, 508 in FIG. 5) are populated with assistance data of respective resolutions correlated with distances between each of the regions and the focal point 510.

Figure 11:
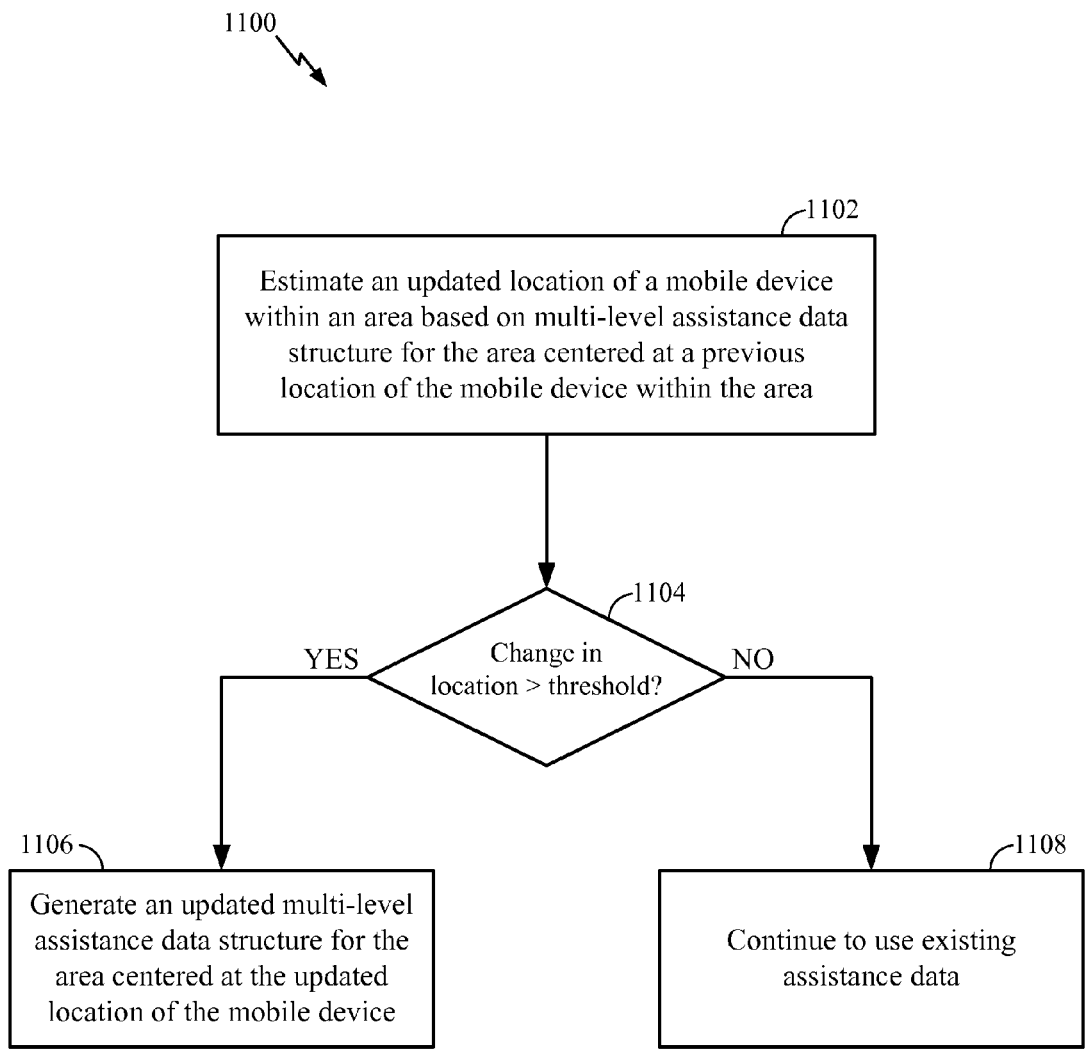
FIG. 11 is a block flow diagram of a process of updating position assistance data for a mobile device according to movement of the mobile device.

Referring to FIG. 11, with further reference to FIGS. 1-8, a process 1100 of updating position assistance data for a mobile device 12 according to movement of the mobile device includes the stages shown. The process 1100 is, however, an example only and not limiting. The process 1100 can be altered, e.g., by having stages added, removed, rearranged, combined, and/or performed concurrently. Still other alterations to the process 1100 as shown and described are possible.

At stage 1102, an updated location of a mobile device 12 within an area (e.g., a venue 110) is estimated, e.g., by a location estimation module 310. The estimate is made based on a multi-level assistance data structure 402 for the area, which is centered at a previous location of the mobile device 12 within the area.

At stage 1104, it is determined whether a change, if any, between the updated location determined at stage 1102 and the previous location is greater than a threshold. If the change is greater than the threshold, the process 1100 continues to stage 1106. At stage 1106, an updated multi-level assistance data structure 404 is generated for the area, e.g., by an assistance data retrieval module 320 and/or an assistance data population module 330, as described above. The updated structure is centered at the updated location of the mobile device 12, as determined at stage 1102.

If a change in location of at least the threshold is not detected at stage 1104, the process instead proceeds to stage 1108, in which the mobile device 12 continues using existing assistance data 402.

Each of the processes 900, 1000, 1100, described above, as well as any modules utilized in performing said processes, may be implemented at least in software, e.g., based on software 24 stored on a non-transitory memory 22 and executed by a processor 20. Other implementations could also be used, including implementations based wholly or in part in hardware and/or firmware, or a combination of software, hardware and/or firmware.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for processing assistance data associated with positioning of a mobile device, the method comprising:
   estimating an initial location of the mobile device within an area;
   retrieving a subset of hierarchical assistance data associated with the area based on the initial location of the mobile device, wherein a resolution of the retrieved subset of the hierarchical assistance data changes as a function of a distance from the initial location of the mobile device; and
   generating a multi-level assistance data structure, for the area, centered at the initial location of the mobile device using the retrieved subset of the hierarchical assistance data wherein the hierarchical assistance data comprise a plurality of levels having mutually distinct resolutions, each level of the plurality of levels including assistance data for an arrangement of points within the area defined according to the resolution for the each level.

2. The method of claim 1 further comprising:
   computing an updated location of the mobile device based on the multi-level assistance data structure; and
   updating the multi-level assistance data structure if the updated location is outside of a first region within the area or a determined accuracy of the updated location is below a threshold by designating the updated location as the initial location and repeating at least one of the retrieving or the generating.

3. The method of claim 1 wherein generating the multi-level assistance data structure comprises:
   populating a first region within the area, the first region spanning a predefined distance from the initial location, with respective first ones of the retrieved subset of the hierarchical assistance data; and
   populating at least a second region within the area, the second region being located outside the first region, with respective second ones of the retrieved subset of the hierarchical assistance data that are different from the first ones of the retrieved subset of the hierarchical assistance data.

4. The method of claim 3 wherein:
   the first ones of the retrieved subset of the hierarchical assistance data are associated with a first level thereof and a first resolution; and
   the second ones of the retrieved subset of the hierarchical assistance data are associated with at least a second level thereof and at least a second resolution that is coarser than the first resolution.

5. The method of claim 1 wherein:
   a finest resolution associated with the hierarchical assistance data is based on a signal measurement accuracy for a communications system associated with the area; and
   at least one of the plurality of levels of the hierarchical assistance data or one or more resolutions associated with the hierarchical assistance data are based on at least one of network transfer limitations associated with the area or mobile device operating capacity.

6. The method of claim 1 wherein each of the plurality of levels of the hierarchical assistance data are associated with a rectangular grid, the rectangular grid comprising points spaced apart at an interval defined by the resolution for the level.

7. The method of claim 1 wherein:
   the method further comprises storing the hierarchical assistance data at a storage device at the mobile device; and
   the retrieving comprises loading the retrieved subset of the hierarchical assistance data into a working memory of the mobile device.

8. The method of claim 1 wherein the retrieving comprises receiving the retrieved subset of the hierarchical assistance data over a communications network associated with the area.

9. A mobile device operable in a wireless communication network, the mobile device comprising:
   a location estimation module configured to estimate an initial location of the mobile device within an area;
   an assistance data retrieval module communicatively coupled to the location estimation module and configured to retrieve a subset of hierarchical assistance data associated with the area based on the initial location of the mobile device, wherein a resolution of the retrieved subset of hierarchical assistance data changes as a function of a distance from the initial location of the mobile device; and
   an assistance data population module communicatively coupled to the assistance data retrieval module and configured to generate a multi-level assistance data structure, for the area, centered at the initial location of the mobile device using the retrieved subset of the hierarchical assistance data, wherein the hierarchical assistance data comprise a plurality of levels having mutually distinct resolutions, each level of the plurality of levels including assistance data for an arrangement of points within the area defined according to the resolution for the each level.

10. The mobile device of claim 9 wherein:
the location estimation module is further configured to compute an updated location of the mobile device based on the multi-level assistance data structure;
the mobile device further comprises a location comparator module communicatively coupled to the location estimation module and the assistance data retrieval module and configured to compare the initial location to the updated location; and
the assistance data retrieval module is further configured to retrieve an updated subset of hierarchical assistance data associated with the area based on the updated location of the mobile device if the initial location of the mobile device and the updated location of the mobile device differ by at least a threshold amount.

11. The mobile device of claim 10 wherein:
the location comparator module is further configured to determine an accuracy associated with the updated location; and
the assistance data retrieval module is further configured to retrieve the updated subset of hierarchical assistance data associated with the area based on the updated location of the mobile device if the accuracy associated with the updated location is below a threshold.

12. The mobile device of claim 10 wherein the assistance data population module is configured to generate the multi-level assistance data structure by populating a first region within the area, the first region spanning a predefined distance from the initial location, with respective first ones of the retrieved subset of the hierarchical assistance data and populating at least a second region within the area, the second region being located outside the first region, with respective second ones of the retrieved subset of the hierarchical assistance data that are different from the first ones of the retrieved subset of the hierarchical assistance data.

13. The mobile device of claim 12 wherein:
the first ones of the retrieved subset of the hierarchical assistance data are associated with a first level thereof and a first resolution; and
the second ones of the retrieved subset of the hierarchical assistance data are associated with at least a second level thereof and at least a second resolution that is coarser than the first resolution.

14. The mobile device of claim 9 wherein:
a finest resolution associated with the hierarchical assistance data is based on a signal measurement accuracy for the wireless communication network; and
at least one of the plurality of levels of the hierarchical assistance data or one or more resolutions associated with the hierarchical assistance data are based on at least one of network transfer limitations associated with the area or an operating capacity of the mobile device.

15. The mobile device of claim 9 wherein each of the plurality of levels of the hierarchical assistance data are associated with a rectangular grid, the rectangular grid comprising points spaced apart at an interval defined by the respective resolution for the level.

16. The mobile device of claim 15 wherein resolutions for respective ones of the plurality of levels are associated with exponentially increasing intervals.

17. The mobile device of claim 9 wherein:
the mobile device further comprises a working memory and a local storage unit communicatively coupled to the working memory and the assistance data retrieval module and configured to store the hierarchical assistance data; and
the assistance data retrieval module is further configured to instruct loading of the retrieved subset of the hierarchical assistance data from the local storage unit to the working memory.

18. The mobile device of claim 9 wherein:
the mobile device further comprises a transceiver communicatively coupled to the assistance data retrieval module; and
the assistance data retrieval module is further configured to instruct communication of the retrieved subset of the hierarchical assistance data to the mobile device over the wireless communication network via the transceiver.

19. An apparatus for processing assistance data associated with a positioning operation, the apparatus comprising:
means for estimating an initial location of the apparatus within an area;
means for retrieving a subset of hierarchical assistance data associated with the area based on the initial location of the apparatus, wherein a resolution of the retrieved subset of hierarchical assistance data changes as a function of a distance from the initial location of the apparatus; and
means for generating a multi-level assistance data structure for the area centered at the initial location of the apparatus using the retrieved subset of the hierarchical assistance data, wherein the hierarchical assistance data comprise a plurality of levels having mutually distinct resolutions, each level of the plurality of levels including assistance data for an arrangement of points within the area defined according to the resolution for the each level.

20. The apparatus of claim 19 wherein the means for generating comprises:
means for populating a first region within the area, the first region spanning a predefined distance from the initial location, with respective first ones of the retrieved subset of the hierarchical assistance data; and
means for populating at least a second region within the area, the second region being located outside the first region, with respective second ones of the retrieved subset of the hierarchical assistance data that are different from the first ones of the retrieved subset of the hierarchical assistance data.

21. The apparatus of claim 20 wherein:
the first ones of the retrieved subset of the hierarchical assistance data are associated with a first level thereof and a first resolution; and
the second ones of the retrieved subset of the hierarchical assistance data are associated with at least a second level thereof and at least a second resolution that is coarser than the first resolution.

22. The apparatus of claim 19 wherein:
the apparatus further comprises means for locally storing the hierarchical assistance data; and
the means for retrieving comprises means for loading the retrieved subset of the hierarchical assistance data into a working memory of the apparatus.

23. The apparatus of claim 19 wherein the means for retrieving comprises means for receiving the retrieved subset of the hierarchical assistance data over a communications network associated with the area.

24. A mobile communications device comprising:
   at least one processor configured to execute instructions which, when executed, cause the at least one processor to:
   estimate an initial location of the mobile communications device within an area;
   retrieve a subset of hierarchical assistance data associated with the area based on the initial location of the mobile communications device, wherein a resolution of the retrieved subset of hierarchical assistance data changes as a function of a distance from the initial location of the mobile communications device; and
   generate a multi-level assistance data structure, for the area, centered at the initial location of the mobile communications device using the retrieved subset of the hierarchical assistance data, wherein the hierarchical assistance data comprise a plurality of levels having mutually distinct resolutions, each level of the plurality of levels including assistance data for an arrangement of points within the area defined according to the resolution for the each level; and
   a memory coupled to the at least one processor and configured to store the instructions.

25. The mobile communications device of claim 24 wherein the instructions further comprise instructions which, when executed, cause the at least one processor to generate the multi-level assistance data structure by populating a first region within the area, the first region spanning a predefined distance from the initial location, with respective first ones of the retrieved subset of the hierarchical assistance data and populating at least a second region within the area, the second region being located outside the first region, with respective second ones of the retrieved subset of the hierarchical assistance data that are different from the first ones of the retrieved subset of the hierarchical assistance data.

26. The mobile communications device of claim 24 wherein:
   the first ones of the retrieved subset of the hierarchical assistance data are associated with a first level thereof and a first resolution; and
   the second ones of the retrieved subset of the hierarchical assistance data are associated with at least a second level thereof and at least a second resolution that is coarser than the first resolution.

* * * * *